United States Patent [19]

Popplewell

[11] 4,149,910
[45] Apr. 17, 1979

[54] GLASS OR CERAMIC-TO-METAL COMPOSITES OR SEALS INVOLVING IRON BASE ALLOYS

[75] Inventor: James M. Popplewell, Guilford, Conn.

[73] Assignee: Olin Corporation, New Haven, Conn.

[21] Appl. No.: 580,616

[22] Filed: May 27, 1975

[51] Int. Cl.² ............................................. C03C 27/02
[52] U.S. Cl. ...................................... 148/6.35; 65/43; 65/59 R; 427/193; 427/330; 427/376 D; 428/450; 428/433
[58] Field of Search ............... 428/432, 433, 450, 469, 428/539; 427/193, 330, 376 D; 148/6.3, 6.35, 31.5; 29/195, 195.5; 65/43, 59 R, 59 B

[56] References Cited

U.S. PATENT DOCUMENTS

| 3,345,218 | 10/1967 | Brookover et al. | 148/6.35 |
| 3,526,550 | 9/1970 | Larson et al. | 148/6.35 |
| 3,574,584 | 4/1971 | Girard et al. | 65/59 R |
| 3,631,589 | 1/1971 | Garceau | 65/59 R |
| 3,676,292 | 7/1972 | Pryor et al. | 65/59 B |
| 3,826,627 | 7/1974 | Pryor et al. | 29/191 |
| 3,826,629 | 7/1974 | Pryor et al. | 428/432 |
| 3,977,857 | 8/1976 | Mattox | 65/59 R |

*Primary Examiner*—Stanley S. Silverman
*Attorney, Agent, or Firm*—Victor A. DiPalma; Paul Weinstein

[57] ABSTRACT

Glass or ceramic-to-metal composites or seals wherein the glass or ceramic is bonded to an iron base alloy consisting essentially of from 1–5% silicon and from 1–10% chromium, remainder iron. The alloy develops a thermal oxide film which consists essentially of chromium oxide and $\alpha Fe_2O_3$ which may comprise from 10 to 100% of the oxide film thickness on the metal. The invention also includes a process of bonding the glass or ceramic to the metal which eliminates the need of a prolonged heat treatment performed in a special atmosphere.

5 Claims, 1 Drawing Figure

U.S. Patent     Apr. 17, 1979     4,149,910
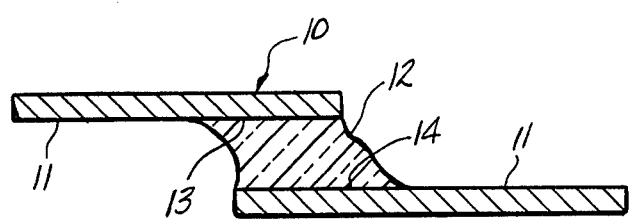

GLASS OR CERAMIC-TO-METAL COMPOSITES OR SEALS INVOLVING IRON BASE ALLOYS

BACKGROUND OF THE INVENTION

There are many metal-glass-ceramic applications and systems which have in common the bonding of a glass or ceramic material to the surface of a metal. One common application is the preparation of hermetic seals for metal semi-conductor devices. Characteristically, in such applications, the glass or ceramic does not bond directly to the metal, but to an oxide film which is conventionally formed by a thermal treatment of the metal prior to bonding. The resulting oxide acts as the bonding agent in that it is bonded to the underlying metal and the glass or ceramic material. Therefore, the characteristics of the metal oxide exert a profound influence upon the overall properties of the glass or ceramic-to-metal bond.

Most metal oxides and mixtures of metal oxides which have been developed upon the surface of most metals and alloys, in accordance with the prior art, possess poor mechanical properties. Therefore, the prior art glass or ceramic-to-metal composites and seals have been designed to minimize the stresses developed at the bond interface because of its relatively poor strength. It is generally known that those glasses and ceramics which possess the desirable bonding and sealing characteristics also have coefficients of thermal expansion which are substantially smaller than the coefficients of thermal expansion of most metals and alloys. Therefore, the prior art has developed a series of low expansivity metal alloys, which have coefficients of thermal expansion for a limited temperature range which reasonably closely match the coefficients of thermal expansion of many sealing glasses or ceramics as set forth in Table I.

ment must often be performed in a special atmosphere such as wet hydrogen to form an oxide film possessing the required properties. The treatment is time consuming and produces an oxide generally quite thick in nature and characterized by poor mechanical properties.

SUMMARY OF THE INVENTION

In accordance with this invention, it has been found that an iron base alloy consisting essentially of 1-5% silicon and 1-10% chromium forms on its surface an oxide layer consisting essentially of chromium oxide and $\alpha Fe_2O_3$ in the form of a compact continuous film. The oxide film forms immediately adjacent to the metal surface is strongly adherent to it. The presence of silicon in the above amount in the alloy has been found to promote the adherence of the oxide both to the metal and to a glass or ceramic material which may be bonded thereto. Thus, when a glass or ceramic material is bonded to the alloy of this invention having this film, a strong bond results.

Because of the high bond strength between the alloy of this invention and the glass or ceramic component, it is possible to fabricate glass or ceramic-to-metal composites or seals with a high degree of mismatch of coefficient of thermal expansion between the glass or ceramic and the metal. Likewise, the strength and adherence exhibited by the oxide film of this invention permits the formation of a thinner more efficient oxide layer without the prolonged, controlled atmosphere heat treatment usually employed with the alloys of the prior art. Further, the characteristically low expansivity exhibited by the iron base alloys employed in accordance with this invention eliminates the necessity of using the costly nickel-containing low expansivity alloys. Finally, there is also a marked improvement in oxidation and corrosion resistance as compared to the alloys of the prior art.

TABLE 1

| Materials | Composition | Thermal Expansion Coeff. in/in/° C. |
|---|---|---|
| A. METALS | | |
| KOVAR ASTM No. F-15-68 (RODAR) | Fe + 29% Ni + 17% Co + 0.45% Mn + 0.10% Si + 0.02% C. | $41 \times 10^{-7}$ (at 20° C.)<br>$60 \times 10^{-7}$ (at 100° C.)<br>$118 \times 10^{-7}$ (at 500° C.)<br>$49 \times 10^{-7}$ (range 0°-400° C.) |
| NICKEL | 100% Ni | $128 \times 10^{-7}$ (at 20° C.) |
| NIRON 52 ASTM No. F-30-68 | 51% Ni, 49% Fe | $98 \times 10^{-7}$ (range 25°-500° C.) |
| NIRON 42 ASTM No. F-30-68 | 41% Ni, 59% Fe | $47 \times 10^{-7}$ (range 30°-300° C.) |
| NIRON 46 ASTM No. F-30-68 | 46% Ni, 54% Fe | $77 \times 10^{-7}$ (range 30°-350° C.) |
| DUMET ASTM No. F-29-68 | 43% Ni, 57% Fe | $68 \times 10^{-7}$ (range 30°-400° C.) |
| SYLVANIA No. 4 ASTM No. F-31-68 | 42% Ni, 6% Cr, 52% Fe | $89 \times 10^{-7}$ (range 30°-350° C.) |
| B. GLASSES AND CERAMICS | | |
| SODA - LIME - SILICA GLASS | 70% Si $O_2$, 11% Ca O, 14% $Na_2$ O, + $Al_2O_3$ + Mg O | $90 \times 10^{-7}$ (range 0°-100° C.) |
| PORCELAIN (electrical granulation | 40% Leucite ($K_2$ O, $Al_2O_3$, 4 Si $O_2$) 30% Mullite (3$Al_2O_3$, 2 Si $O_2$) 30% Si $O_2$ | $60 \times 10^{-7}$ (range 0°-1000° C.) |
| SEALING GLASS TYPE 101 ASTM No. F-79-67T | 56% Si $O_2$, 1.5% $Al_2O_3$, 4.0% $K_2O$, 29.0% PbO | $92 \times 10^{-7}$ (range 30°-300° C.) |

Unfortunately, the range of low expansivity alloys which have been developed are not otherwise particularly desirable materials. Initially, these alloys contain nickel as a major alloying addition, and are thus quite costly and exhibit relatively poor corrosion and oxidation resistance.

The above alloys often contain other additions such as chromium and cobalt. The thermal oxide film which is formed on these alloys is generally of mixed composition which is dependent upon the actual alloying additions present in the metal. It is known that to obtain good glass adherence particularly to the above alloys possessing bare surfaces, a separate thermal pre-treat- It is accordingly a principal object of the present invention to provide a glass or ceramic-to-metal composite or seal having improved bond strength between the glass or ceramic and the metal, and to provide a process of making same.

It is a further object of the present invention to provide a glass or ceramic-to-metal composite or seal wherein the metal is an iron base alloy which forms a thin film consisting essentially of chromium oxide and $\alpha Fe_2O_3$ on its surface.

Other objects and advantages will become apparent to those skilled in the art as a detailed discussion of particular embodiments proceeds with reference to the drawings which form a part hereof.

BRIEF DESCRIPTION OF THE DRAWING

The FIGURE is a side view of a typical lap-type glass or ceramic-to-metal seal.

DETAILED DESCRIPTION OF THE PREFERRED EMBODIMENTS

In accordance with this invention, it has been found that iron base alloys can be used in glass or ceramic-to-metal composites or seals, provided that the iron base alloy has certain inherent oxidation characteristics. The characteristics required in the iron base alloy are that it has formed on its surface an oxide consisting essentially of chromium oxide and $\alpha Fe_2O_3$ in the form of a compact continuous film. This oxide film must form immediately adjacent to the metal, be strongly adherent to it and comprise from at least 10% up to 100% of the total oxide film thickness. Suitable iron base alloys for use in the glass or ceramic-to-metal composites or seals of this invention contain from 1–5% silicon and from 1–10% chromium. In a preferred embodiment the alloys consist essentially of from 1 to 3% silicon, from 1 to 3% chromium, balance essentially iron.

In addition to the above elements, the alloys of this invention may also contain aluminum in an amount ranging from about 0.001 to 1%, nickel in an amount ranging from about 0.001 to 5%, cobalt in an amount ranging from about 0.001 to about 5% for additional strength and grain refinement, and carbon in an amount ranging from about 0.001 to 1% for some applications requiring increased strength and wear resistance. Impurities may be present in amounts not adversely effecting the properties of the glass or ceramic-to-metal composite or seals of this invention. In particular, the impurities may include less than 1% nitrogen, less than 1% sulphur, less than 1% manganese, less than 1% molybdenum and less than 1% phosphorus.

The alloys of this invention have excellent high temperature oxidation resistance due to the formation of the protective oxide film. When the metal is oxidized in air, an oxide film is formed which consists essentially of a chromium oxide and $\alpha Fe_2O_3$ mixture. This oxide mixture unexpectedly provides a thin, tightly adherent film which seals efficiently to most glasses and ceramics and, thus, facilitates the formation of excellent glass or ceramic-to-metal bonds. The behavior of the oxide film of the present invention is in marked contrast to that of conventional iron oxide films which are exceedingly thick and mechanically weak, and is believed the result of the specific combination of oxides, particularly as they are formed in the presence of silicon in an amount ranging from 1 to 5% by weight. It appears that the aforenoted amounts of silicon exert a favorable control over the constituents of the film which affects its final mechanical properties.

The ceramic or glass-to-metal composites or seals of the present invention possess a utility in a wide variety of applications where such a seal or composite is desired. Thus, the invention is useful in diverse application as the hermetic package sealing techniques of the semiconductor field and the preparation of composite cookware.

The present invention also includes a method for the preparation of glass or ceramic-to-metal composites or seals which comprises bonding glass or ceramic component to an iron base alloy component having a thin film consisting essentially of chromium oxide and $\alpha Fe_2O_3$ on its surface. The method of this invention eliminates the need for a special pre-oxidizing treatment, as the oxide film may be formed during the heat sealing of the glass or ceramic to the metal surface.

Referring to the drawing, the FIGURE illustrates a sealing arrangement known as a lap-seal. The lap-seal 10 comprises two strips of metal 11 with a glass or ceramic 12 sandwiched between the overlapping surfaces. This arrangement has glass or ceramic-to-metal bonds at interfaces 13 and 14. The lap-seal is employed in tests of bond strength and wettability. Bond strength is measured in terms of shear strength determined from experiments in a tensile testing machine set forth hereinafter. Wettability comprises the ability of the various glasses to coat or wet the metal and is determined by estimating visually the contact angle between the glass and metal. Wettabilities can vary from poor (high contact angle with poor flow characteristics) to excellent (low contact angle with good flow characteristics). In general, it would be expected that the ability to form a bond would increase as wettability increases.

The present invention will be more readily understandable from a consideration of the following illustrative examples.

EXAMPLE I

An iron base alloy was provided which possessed the following composition: 3.0% chromium, 2.0% silicon, balance iron. The alloy possessed coefficients of thermal expansion of $12.2 \times 10^{-6}/°$ C. through the temperature range of 20°–300° C., and $13.4 \times 10^{-6}/°$ C. through the temperature range of 20°–800° C., respectively. The alloy was cast into ingot form by the Durville casting method, and was hot and cold rolled to 0.030" gauge. The metal was sheared into specimens measuring $2" \times \frac{1}{2}"$, which were then degreased in benzene and rinsed in methanol and acetone. The specimens were then heated at 800° C. in air for 3 minutes and cooled rapidly. Samples were prepared for sealing by the placement of a small quantity of glass powder thereon. Six glass powders were tested which possessed differing coefficients of thermal expansion, as set forth in Table II, below.

TABLE II

| Glass Description | Thermal Expansion Coefficient in in/° C. (0°–300° C.) | Sealing Temperature |
|---|---|---|
| Owens Illinois 00130 | $40 \times 10^{-7}$° C. | 615° C. |
| Owens Illinois 00756 | $75 \times 10^{-7}$° C. | 450° C. |
| Owens Illinois 00564 | $83 \times 10^{-7}$° C. | 460° C. |
| Owens Illinois 00766 | $87 \times 10^{-7}$° C. | 435° C. |
| Owens Illinois 00578 | $108 \times 10^{-7}$° C. | 380° C. |
| Owens Illinois 00583 | $117 \times 10^{-7}$° C. | 365° C. |

The six samples were then heated to the normal temperature of sealing of the particular glass powders disposed thereon. After the sealing operation and sufficient cooling had been accomplished, the samples were visually examined and it was observed that a low contact angle existed between the glass and the metal and excellent flow characteristics were observed. These experiments confirmed that the various glasses effectively wet the thermally formed oxide film.

EXAMPLE II

A sample prepared from the alloy described in Example I was employed with one of the glasses listed in Table II to form a lap joint in the manner illustrated in the FIGURE, for the purpose of measuring lap-shear strength. The sample was prepared in accordance with standard sealing procedure employed in Example I. The lap-shear seal was then tested in a tensile testing machine to determine the shear strength, which is a measure of the strength of the seal. Comparative samples were prepared which employed Kovar, a well-known glass sealing alloy, with two different glasses and one additional. The results of the tests are set forth in Table III, below.

TABLE III

| Alloy Identification | Glass Identification | Fracture Stress | Fracture Type |
| --- | --- | --- | --- |
| Example I | 00583 | 1364 psi | Glass |
| KOVAR | 00130 | 505 psi | Interfacial |
| KOVAR | G.E. REX. | 480 psi | Interfacial |
| KOVAR | 00583 | 423 psi | Interfacial |

The data in Table III clearly demonstrates that the composite or seal of the present invention possesses superior bond strength over the composites prepared in the prior art without regard to the particular glass material employed. Thus, the fracture stress values observed for the five samples prepared with the alloy of Example I were uniformly higher than those observed with Kovar, the well-known glass sealing alloy.

Examination of the fracture types indicates that, in the sample representing the present invention, the strength of the glass-to-metal bond was greater than the tensile strength of the glass itself, as fractures were observed predominantly in the glass component. This is believed to occur because the oxide layer of the alloys of the present invention is extremely thin and tightly adherent to the metal, and is, therefore, highly resistant to failure. It can, therefore, be concluded that the actual bond strength in such cases is greater than the shear strength of the glass.

In all instances throughout the specification and claims where percentages are expressed, they are to be considered as weight percents.

It is to be understood that the invention is not limited to the illustrations described and shown herein, which are deemed to be merely illustrative of the best modes of carrying out the invention, and which are suitable of modification of form, size, arrangement of parts and details of operation. The invention rather is intended to encompass all such modifications which are within its spirit and scope as defined by the claims.

What is claimed is:

1. A process for forming a glass or ceramic-to-metal composite or seal which comprises:

preparing an iron base alloy component by providing a mixture comprising from 1–10% chromium, balance iron, and adding to said mixture from 1–5% silicon as based on the total resulting mixture thereof;

oxidizing said iron base alloy component by heating in air at a temperature of up to 800° C. for a maximum of three minutes to form on the surface of said component a thin, adherent oxide film consisting essentially of chromium oxide and $\alpha Fe_2O_3$; and placing a quantity of glass or ceramic metal on the surface of said oxidized iron base alloy component and heating the so-coated component at the sealing temperature of said glass or ceramic for a time sufficient to fuse said glass or ceramic to said iron base alloy component, wherein said composite may be characterized by a high degree of mismatch of coefficient of thermal expansion between said glass or ceramic and said iron base alloy component.

2. The process of claim 1 wherein said oxide film is thermally formed during the heating of the glass or ceramic component in contact with said iron base alloy component.

3. The process of claim 1 wherein the iron base alloy component additionally contains from 0.001–1% aluminum, from 0.001–5% nickel, from 0.001–5% cobalt for added strength and from 0.001–1% carbon for increased wear resistance.

4. The process of claim 1 wherein the iron base alloy component consists essentially of from 1–3% silicon, from 1–3% chromium, and the balance essentially iron.

5. A process for forming a glass or ceramic-to-metal composite or seal which comprises:

preparing an iron base alloy component by providing a mixture comprising from 1–10% chromium, balance iron, and adding to said mixture from 1–5% silicon as based on the total resulting mixture thereof; and placing a quantity of glass or ceramic material on the surface of said iron base alloy component and heating said component in air at the sealing temperature of said glass or ceramic for a time sufficient to fuse said glass or ceramic to said component while oxidizing said iron base alloy component to form a thin adherent oxide film consisting essentially of chromium oxide and $\alpha Fe_2O_3$, wherein said composite may be characterized by a high degree of mismatch of coefficient of thermal expansion between said glass or ceramic and said iron base alloy component.

* * * * *